US005819326A

United States Patent [19]

[11] Patent Number: 5,819,326
[45] Date of Patent: Oct. 13, 1998

Kobayashi et al.

[54] CONNECTING APPARATUS FOR A TOILET AND A DRAINPIPE

[75] Inventors: Hiroshi Kobayashi; Makoto Watanabe; Hiroshi Okada; Hiroshi Tanaka; Toshiaki Kayahara; Katsuyuki Suehiro; Masaya Soh; Hideshi Yamamoto; Kenichi Ogata, all of Kitakyushu, Japan

[73] Assignee: Toto Ltd., Fukuoka-Ken, Japan

[21] Appl. No.: 718,513

[22] PCT Filed: Apr. 6, 1995

[86] PCT No.: PCT/JP95/00676

§ 371 Date: Oct. 8, 1996

§ 102(e) Date: Oct. 8, 1996

[87] PCT Pub. No.: WO95/27833

PCT Pub. Date: Oct. 19, 1995

[30] Foreign Application Priority Data

Apr. 8, 1994 [JP] Japan .................................... 6-070788

[51] Int. Cl.[6] .............................. E03D 11/00; F16L 11/12

[52] U.S. Cl. .............................. 4/252.1; 4/428; 4/DIG. 7; 4/DIG. 9; 285/57; 285/3; 285/58; 285/93; 285/179; 285/226; 285/298; 285/299; 285/915; 285/148.22

[58] Field of Search .................................... 285/56, 148.1, 285/57, 40, 58, 64, 54, 3, 299, 60, 179, 181, 93, 226, 298, 415, 148.22; 4/679, 428, 695, 696, 252.1, DIG. 7, DIG. 9; 29/890.14

[56] References Cited

U.S. PATENT DOCUMENTS

| | | | |
|---|---|---|---|
| 670,588 | 3/1901 | Hinsdale | 285/56 X |
| 674,439 | 5/1901 | Foy | 285/58 X |
| 901,545 | 10/1908 | Morrison | 285/56 |
| 961,685 | 6/1910 | Cosgrove | 285/58 X |
| 1,335,056 | 3/1920 | Hinsdale | 285/58 X |
| 1,878,195 | 9/1932 | Sisk | 285/58 |
| 2,449,265 | 9/1948 | WIlliams | 285/93 X |
| 4,171,548 | 10/1979 | Wilson | 285/58 X |
| 4,810,008 | 3/1989 | Brodie | 285/179 X |

FOREIGN PATENT DOCUMENTS

| | | | |
|---|---|---|---|
| 44726 | 10/1888 | Germany | 285/93 |
| 62-185775 | 11/1987 | Japan . | |
| 2-35134 | 2/1990 | Japan . | |
| 2-35135 | 2/1990 | Japan . | |
| 2-144085 | 12/1990 | Japan . | |
| 4463 | 1/1888 | United Kingdom | 285/56 |
| 119087735 | 5/1970 | United Kingdom | 285/58 |

*Primary Examiner*—Dave W. Arola
*Attorney, Agent, or Firm*—Birch, Stewart, Kolasch & Birch, LLP

[57] ABSTRACT

In connecting a flushing port (2) of a toilet stool (1) which is formed so as to face the floor surface to which the toilet stool (1) is installed to a drainpipe (3) of the building, the connection is made by means of a flushing-side connecting pipe (6) which connects to the flushing port (2), a drain-side connecting pipe (7) which connects to the drainpipe (3), and a linking pipe (8) which makes connection between the above-noted two pipes. In making the pipe connections, the linking pipe (8) is cut off in accordance with the distance between the flushing port (2) and the drainpipe (3) or pipe insertion overlap can be used to adjust the length of the linking pipe (8).

32 Claims, 12 Drawing Sheets

CONNECTING APPARATUS FOR A TOILET AND A DRAINPIPE

TECHNICAL FIELD

The present invention relates to a bottom-flushing flush-type toilet stool, and more particularly to the connection structure which enables simple connection between the drain port of the toilet stool and the building-mounted drainpipe when replacing a toilet stool with a new one.

BACKGROUND ART

The general installation construction of a bottom-flushing flush-type toilet stool in the prior art is such that a drain port on the bottom surface of the toilet stool is received by a special flange provided on the top end of a drainpipe provided in the building, thereby linking the two in a sealed manner.

In the case in which a new toilet stool is to be installed in an existing building, the position of the building-mounted drainpipe inside the toilet stool is pre-established. If the specifications of the toilet stool to be newly installed are different than those of the previously installed toilet stool, the relative front-to-back position of the drain port of the toilet stool with respect to the toilet stool itself can be different. For that reason, when installing the toilet stool, when using the building-mounted drainpipe position as the reference, there are many cases in which the toilet stool itself will interfere with a wall or other part of the toilet stool.

To eliminate this type of interference in this type of installation, there is a connecting part, as noted in Utility Model Laid-Open Publication Hei 2-144085 (1990), which absorbs the positional skew between the drainpipe of the building and the drain port of the toilet stool.

This connecting part has two parts: a toilet stool side connecting part which links to the drain port of the toilet stool, and a drainpipe connecting part which links to the drainpipe of the building, the drainpipe connecting part being connected in a direction which is approximately horizontal from the peripheral surface of the toilet stool side connecting part, which is oriented approximately upright, the end of this drainpipe connecting part being bent downward and connected to the drainpipe. Using this type of connecting part, by cutting off the horizontal part of the drainpipe connecting part in accordance with the positional skew between the drain port and the drainpipe to adjust its length, it is possible to make connection to the flow passage, even if the positional relationship between the drain port of the toilet stool and the drainpipe of the building differs between individual locations.

However, to be able to accommodate even the case in which the positional skew between the drain port and the drainpipe is large, it is necessary to make the horizontal part of the drainpipe side connecting part long. For this reason, because the connecting part includes a horizontal part, on one end of which is a drain port connection part and a flange part that links to the drainpipe connecting part, this part itself becomes large. In a horizontal part that is large in comparison with the flange part that connects to the drainpipe, there is a large possibility that its end exhibits twisting deformation or the like. When this type of twisting occurs, the installation will involve a skew between the centers of the drainpipe and the drain port, thus greatly affecting the seal. In addition, because the connection part is L-shaped, in addition to making the installation work difficult, it is easy for bending to occur in the cutting plane.

Also, because it is necessary when performing the installation to cut off part of the horizontal part of the drainpipe side connecting part, erroneously cutting this off to the wrong dimension at the installation site can be envisioned. Therefore, not only is the cutting off task troublesome, but also the quality of the installation is established by the quality of this cutting off process, thereby presenting a problem in ease of installation.

In addition, because the connections of the connecting part to the drain port and to the drainpipe are made using an adhesive and a seal, working with the adhesive is troublesome, and if insufficient adhesive is applied, a bad seal can result, very likely leading to a water leak.

On the bottom of the toilet stool, a trap passageway leading from the bowl is in an approximate U shape, facing downward, with a limited amount of space for pipe connections. For this reason, it is not possible to establish a large clearance between the connecting part and the bottom wall of the toilet stool, and, depending upon the accuracy of the installation, interference with the toilet stool can result, thereby preventing a high-quality installation.

By raising the level of the bottom of the toilet stool to make the clearance large, the above-noted problems can be solved. However, because this would raise the level of the internal flow path of the toilet stool, the water-trapping level from the bowl to the trap would also rise. For that reason, it is necessary to raise the rim level of the toilet stool, so that a difference is established with respect to the water-trapping level.

However, when the water-trapping level rises, the distance between the toilet seat surface and the surface of the standing water shortens, leading to problems of water splashing when the toilet seat is used. In addition, when flushing water is fed, the standing water level rises suddenly and could even come up to almost completely fill the bowl, thereby greatly affecting the ease of usage of the toilet stool.

As a countermeasure, the toilet stool rim surface could be raised to eliminate the problem of the elevated level of the standing water. However, since the sitting level would rise accordingly, although normally healthy users would have no problem, children and persons with health problems and the like would experience difficulty.

In this manner, when making connections to a drainpipe for the purpose of installing a new toilet seat in an existing location, in terms of, for example, establishing a proper flow passage between the drain port of the toilet stool and the drainpipe of the building in the case in which the connecting structure is separated into two parts, and interference with the bottom surface of the toilet stool cannot be ignored in performing the installation.

In the case in which the drainpipe is installed perpendicularly with respect to a vertical wall surface, it is necessary to link the drain port of the toilet stool to this drainpipe, adjusting the drain port to the height of the drainpipe, in which case there is a problem, similar to the one noted above, with regard to position adjustment.

The present invention was made in consideration of the above-noted problems, and has as an object the provision of a connecting apparatus for use in, for example, the replacement installation of a toilet stool, this connecting apparatus both simplifying the connection to the drainpipe of the building and enabling a good seal to be achieved when performing this installation. The present invention further provides a connecting apparatus for making connection without having to change the specifications of the newly installed toilet stool so that, for example, it is higher than the existing toilet stool.

DISCLOSURE OF THE INVENTION

The present invention is a connecting apparatus which connects to the drain port of a toilet stool which is formed so as to face the surface of the floor onto which the toilet stool is installed, and to a drainpipe which is installed so as to face the bottom surface of the toilet stool at a floor position which is skewed from the above-noted flushing port of the toilet stool, this connecting apparatus having a flushing-side connecting pipe which connects to the above-noted flushing port, a drain-side connecting pipe which connects to the above-noted drainpipe, and a linking pipe which makes a connection between the above-noted flushing-side connection pipe and the above-noted drain-side connecting pipe.

At least the above-noted flushing-side connecting pipe has an L-shaped internal flow path, the corner part of which is formed by a smooth bend.

It is possible to mount seals to the outer peripheral surface of both ends of the linking pipe, these seals providing a sealed connection to the flushing-side connecting pipe and/or the drain-side connecting pipe.

In addition, it is possible to make the cross-sectional shape of at least the outside contour of both ends of the linking pipe flat, the flushing-side connecting pipe and drain-side connecting pipe being configured so as to fit inside or fit over the flat outside contour of the above-noted linking pipe.

The linking pipe can have a marking which indicates the length to which it is to be cut. In this case, the marking can indicate the cut length with respect to the distance to the center of the drainpipe from the wall which opposed the rear side of the toilet stool, or can indicate the cutting distance with respect to the distance from the center of the drain port of the toilet stool to the center of the above-noted drainpipe.

The flushing-side connecting pipe can be provided with an indication for the purpose of adjusting it to the position of the flushing port of the toilet stool, the drain-side connecting pipe can be provided with an indication for the purpose of showing the insertion limit of the above-noted linking pipe, and the linking pipe can be made of a flexible material which can be stretched and compressed.

It is possible to insert the linking pipe into or fit the linking pipe over at least one of the flushing-side connecting pipe and drain-side connecting pipe, either the outer surface of the inserted pipe or the inner surface of the overfilling pipe being held in place with a resilient sealing material, thereby not only enabling a resilient linkage to either the inserted pipe or the overfitting pipe via this resilient sealing material, but also enabling adjustment of position in the axial direction.

It is also possible to join in a sealed manner at least one of the flushing-side connecting pipe and drain-side connecting pipe to the linking pipe by male threads and female threads formed in each, thereby enabling adjustment of position in the axial direction.

It is possible to provide on, and as one with, the drain-side connecting pipe, a mating ring which can be inserted into the drainpipe, the mating ring in this case having on its outer surface a sealing ring which seals the inner surface of the above-noted drainpipe.

It is further possible to route and connect the flushing-side connecting pipe, the linking pipe, and the drain-side connecting pipe around the left-to-right center of the toilet stool.

It is further possible to form the flow path from the bowl of the toilet stool to the trap flow path of the toilet stool so as to be offset to either the right or the left of the lateral center of the toilet stool, and to route the linking pipe so as to avoid the outer wall which forms a trap flow path from the bowl.

It is possible to connect a branched drain connecting part to one of the flushing-side connecting pipe, the drain-side connecting pipe, and the linking pipe. And it is also possible to form this branched drain connecting part as one with one of the flushing-side connecting pipe, the drain-side connecting pipe, and the linking pipe.

In addition, in the present invention, in a linking apparatus which links a flushing port that is formed at the end of the trap drainage path of a toilet stool and a drainpipe which is provided perpendicularly to a vertical wall, the linking apparatus has a flushing-side connecting pipe which is connected to the flushing port, a drain-side connecting pipe which is connected to the drainpipe, and a linking pipe which makes a connection between the flushing-side connecting pipe and drain-side connecting pipe, the linking pipe having formed on it a marking which indicates the length to which it is to be cut.

It is also possible for the linking pipe to be formed from a horizontal part and an inclined part, a marking being provided on the horizontal and inclined parts. Further it is possible to have the linking pipe be a vertical pipe, and to have the drain-side connecting pipe be L-shaped so as make the drain path perpendicular to this.

BEST MODE FOR CARRYING OUT THE INVENTION

Figure 1:
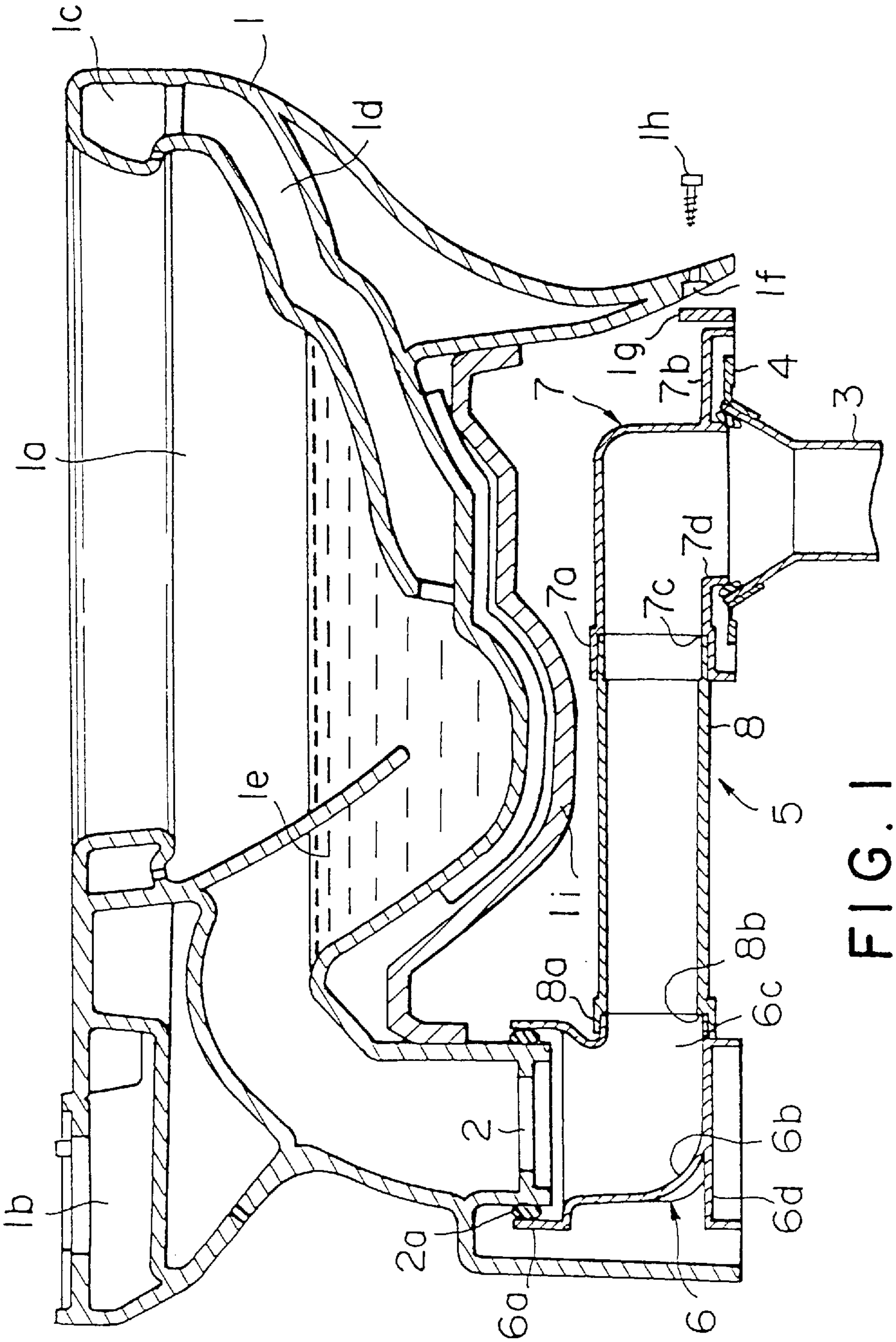
FIG. 1 is a vertical cross-sectional view which shows a flush-type toilet stool having a connecting apparatus according to the present invention.

FIG. 1 is a vertical cross-sectional view which shows a flush-type toilet stool which is provided with a connecting apparatus according to the present invention.

The toilet stool 1 has a bowl 1*a*, a water supplying chamber 1*b* for the purpose of supplying flushing water to the bowl 1*a*, a rim water passageway 1*c*, and a jet water passage 1*d* for siphoning. Downstream in the bowl 1*a* is formed a trap passage 1*e*, which is in the approximate shape of an upside-down U, and at the lower end of this trap passage 1*e* is provided a flushing port 2, which faces toward the floor. The level of this flushing port 2 is slightly higher than a convention bottom-flushing flush-type toilet stool, so that an appropriate spacing is formed between the bottom surface of the contour from the bowl 1*a* to the flushing port 2 and the floor surface.

In the area near the outer periphery of the toilet stool 1 is provided one or more mounting holes 1*f* for the purpose of holding the toilet stool to the floor surface. A mounting block 1*g*, made of wood or the like, is mounted in the floor beforehand, so as to face the mounting holes 1*f*, so that after the toilet stool 1 is positioned, screws 1*h* can be screwed through the mounting holes 1*f* and into the mounting blocks 1*g* to hold the toilet stool 1 in place on the floor surface. In the trap path 1*e*, which is the bottom surface of the toilet stool, and in the surrounding area, heat-insulating material 1*i* which is made of Styrofoam is adhesively fixed. This heat-insulating material 1*i*, is built into the toilet stool as is known in the prior art, for the purpose of preventing freezing at the outer surface of the toilet stool under cold weather conditions.

Figure 11:
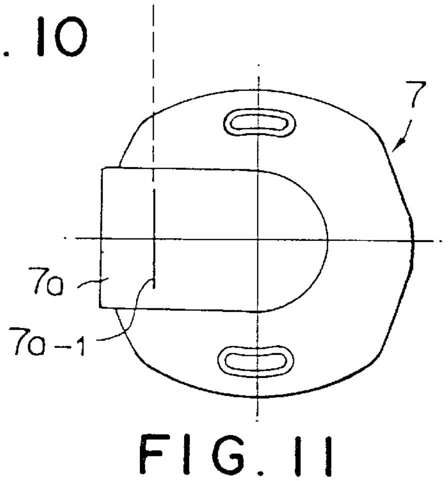

A floor flange 4, which was used to make connection to the previously installed toilet stool is left on the top end of the drainpipe 3, which is already sunken into the building at the installation site. This prior art floor flange 4, which is as disclosed in FIG. 11 and FIG. 13 of the Utility Model Laid-Open Publication, can be used as is.

A connecting unit 5, the length of which can be changed to suit the distance between the flushing port 2 of the toilet stool 1 and the drainpipe 3 is built in between the flushing port 2 of the toilet stool 1 and the drainpipe 3. This connecting unit 5 is formed by three parts: a flushing-side connecting pipe 6 which links to the flushing port 2 of the toilet stool 1, a drain-side connecting pipe 7 which connects to the drainpipe 3 via the floor flange 4, and a linking pipe 8 which provides a link between these connecting pipes 6 and 7. A plan view of the connecting unit 5 is provided in FIG. 2.

The flushing-side connecting pipe 6 is in the form of a 90-degree elbow, the linking seat 6*a* at its top end being fitted around the outside surface of the flushing port 2, these being connected and held together by a sealing material 2*a*. A linking seat 6*a* is joined to a linking seat 6*c*, which has an aperture with a horizontal axis and which is provided on the downstream end via a gradual bending vent 6*b*, and in the example shown in this drawing, the linking seat 6*c* is connected to the linking pipe 8 by being fitted over its outside. On the bottom end of the flushing-side connecting pipe 6, a mounting flange 6*d* is provided, mounting screws being passed through mounting holes 6*e* provided in this mounting flange 6*d* to enable mounting to the floor surface.

The drain-side connecting pipe 7 has a connecting seat 7*a* which has an opening with a horizontal axis, and a flange 7*b* which has an opening which has an axis which is perpendicular to the axis of the opening of the connecting seat 7*a*. In this example, a stepped part 7*c* is provided, this having an inner diameter which is larger than the downstream part, the linking pipe 8 being inserted into the drain-side connecting pipe 7 and being received by this step part 7*c*. On the bottom surface of the flange 7*b* is provided an annular seat 7*d* which mates with the seal part of the floor flange 4, screws being passed through holes 7*e* which are provided at two locations on this flange 7*b* to enable mounting to the floor.

The linking pipe 8 is made of, for example, a synthetic resin pipe such as polyvinyl chloride, onto one end of which is formed a joining seat 8*a* into which is inserted the connecting seat 6*c* of the flushing-side connecting pipe 6.

When installing the toilet stool 1 to replace an existing toilet stool, using the existing drainpipe 3, it is necessary to know the distance between the centers of the flushing pipe 2 of the toilet stool 1 and the drainpipe 3. In this case, the distance between the wall which faces the rear part of the toilet stool 1 (the left side as shown in FIG. 1) and the center of the flushing port 2 (generally referred to as the "rough-in") can be determined from the specifications of the toilet stool. Therefore, by measuring the distance between the wall and the center of the existing drainpipe 3, it is possible to determine the distance between the center of the flushing port 2 and the center of the drainpipe 3, and then to cut the linking pipe 8 to a length that corresponds to the distance between the center of the flushing-side connecting pipe 6 and the center of the drain-side connecting pipe 7.

Figure 4:
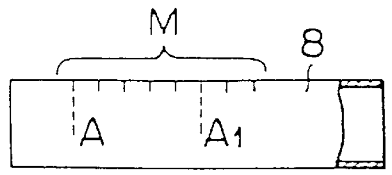
FIG. 4 is a drawing which shows an example of the marking provided on the linking pipe.

FIG. 4 shows an example in which a marking has been applied to the surface of the linking pipe 8 in order to simplify the task of cutting the linking pipe 8. In this example, the linking pipe 8 is a uniform-diameter pipe and instead of providing a joining seat 8*a*, the flushing-side connecting pipe 6 connecting seat 6*c* is formed to have a larger diameter, enabling the end of the linking pipe 8 to be butted up against the step part 6*f* inside the connecting seat 6*c*.

Figure 3:
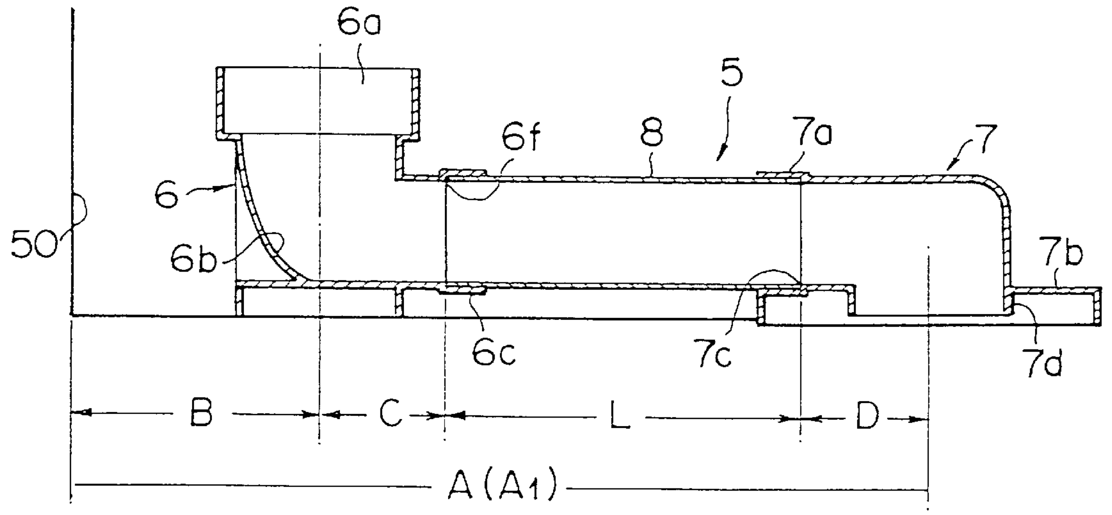
FIG. 3 is a drawing which illustrates the method of establishing the cutting dimensions of a linking pipe, showing the required dimensions as referenced to a wall in the toilet.

In establishing the cutting length of the linking pipe 8, the wall opposing the front-to-back direction of the toilet stool 1 (the left-to-right direction in FIG. 1) can be used as a reference, and in the example shown in FIG. 3, the wall 50, which opposes the rear end of the toilet stool 1 is taken as the reference.

In doing this, the distance A from the wall 50 to the center of the drainpipe 3 can be determined by measurement, and the distance B to the flushing port 2 of the toilet stool 1 when it is installed can be determined from the specifications of the toilet stool 1. The distance C from the center of the flushing-side connecting pipe 6 to the step part 6*f* and the distance D from the center of the drain-side connecting pipe 7 to the step part 7*c* are knowns, the distance between these step parts 6*f* and 7*c* corresponding to the length of the linking pipe 8. Therefore, with respect to the above-noted length conditions A through D, the linking pipe 8 is cut to its final length L, where this length L is calculated as L=A−(B+C+D).

Since in the installation of the toilet stool 1 the distance B from the center of the flushing-side connecting pipe 6 to the wall 50 corresponds to the above-noted rough-in distance, if this rough-in distance is made uniform for a new installation, the only variable in the above-presented equation is A. Therefore, a scale marking M, corresponding to this expected value of A, is marked onto the surface of the linking pipe 8, the value indicated on the scale M being adjusted to correspond to the distance A. By doing this, by simply measuring the distance from the wall 50 to the center of the drainpipe 3, and establishing the position on the scale M corresponding to this value as the cutting plane position, it is possible to obtain a linking pipe 8 having a length that satisfies the above-noted length equation.

In this manner, by providing a scale M on the linking pipe 8, the task of cutting the linking pipe 8 is simplified, this not only shortening the amount of time required for installation, but also enabling achievement of a connection with a linking pipe 8 that is neither too long nor too short.

After cutting the linking pipe 8 according to the method described above, this linking pipe 8 is joined to both the flushing-side connecting pipe 6 and the drain-side connecting pipe 7. In the example shown in FIG. 1, the joining seat 8*a* of the linking pipe 8 is fitted over the connecting seat 6*c* of the flushing-side connecting pipe 6, the end of this connecting seat 6*c* being positioned by it butting up against the step part 8*b* of the linking pipe 8, with the other end of the linking pipe 8 fitted into the connecting seat 7*a* of the drain-side connecting pipe 7, the end of the pipe being positioned by it butting up against the step part 7*c* of the drain-side connecting pipe 7.

FIGS. 5 through 11 show another embodiment of the present invention, in which elements that are the same as in the above-described embodiment being assigned the same reference numerals as in the above-described embodiment and are not described in detail below.

In this embodiment of the present invention, the linking pipe 8, rather than having the shape of a round pipe as in the above-described embodiment, has a cross section which is slightly flattened non-circular shape and which exhibits left-to-right symmetry. Both the flushing-side connecting pipe 6 and the drain-side connecting pipe 7 to which this linking pipe 8 is joined have openings of shapes that correspond to the shape of the linking pipe 8.

The flushing-side connecting pipe 6, similar to the case shown in FIG. 3, has an opening cross section, into which the linking pipe 8 is inserted, which is made large, a step part 6*f* being formed at a part at which the inner diameter of this flushing-side connecting pipe becomes smaller. The linking seat 6*a* has a seal material 50 inserted in it and formed as one with it for the purpose of achieving a sealed joint with the flushing port 2 of the toilet stool which dropped into it. The part of the seal material 50 that is inserted into the flushing port 2 is formed in the shape of a conical mortar, with a plurality of annular grooves 50*a* being provided on the inner surface thereof.

On the surface of the flange 6*d* of the flushing-side connecting pipe 6 a marker line 6*d*–1 is provided as a marker on a line segment which passes through the center of the linking seat 6*a* and intersects the axis of the linking pipe 8 perpendicularly. This marker line 6*d*–1 is formed as one with the flange 6*d* as a protrusion which extends outward a bit from the surface of the flange 6*d*.

The drain-side connecting pipe 7, in the same manner as was shown in the example of FIG. 3, has a step part 7*c* formed on the inner surface of the connecting seat 7*a* into which the linking pipe 8 is inserted, this step part 7*c* receiving the end of the linking pipe 8. On the outer surface of the connecting seat 7*a* is provided a marker line 7*a*–1 as a marker, this being positioned so as to correspond to the position of the step part 7*c*. This marker line 7*a*–1, similar to the case of the flushing-side connecting pipe 6, is in the form of a protrusion which extends slightly from the surface of the connecting seat 7*a*, and which is a line segment which intersects perpendicularly with the axis of the connecting seat 7*a*.

Figure 7:
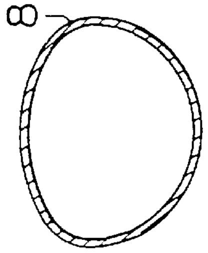
FIG. 7 is a vertical cross-sectional view which shows the linking pipe in the connecting units shown in FIG. 5 and FIG. 6.

The linking pipe 8, similar to the linking pipe of the previously described embodiment, has a scale M provided on its outer surface. This scale M indicates the cutting length of the linking pipe 8 which corresponds to the distance of the center of the drainpipe 3 from the flushing port 2 of the toilet stool 1. Having a non-circular cross-sectional shape as shown in FIG. 7, when this linking pipe 8 is linked to the flushing-side connecting pipe 6 and the drain-side connecting pipe 7, it is possible to position these elements with no rotation of these connecting pipes 6 and 7 about the axis of the linking pipe 8. Therefore, it is possible to make parallel the axes of the parts of the flushing-side connecting pipe 6 and the drain-side connection pipe 7 which connect, respectively, to the flushing port 2 and the drainpipe 3, and to prevent twisting from occurring when the installation is done.

Figure 5:
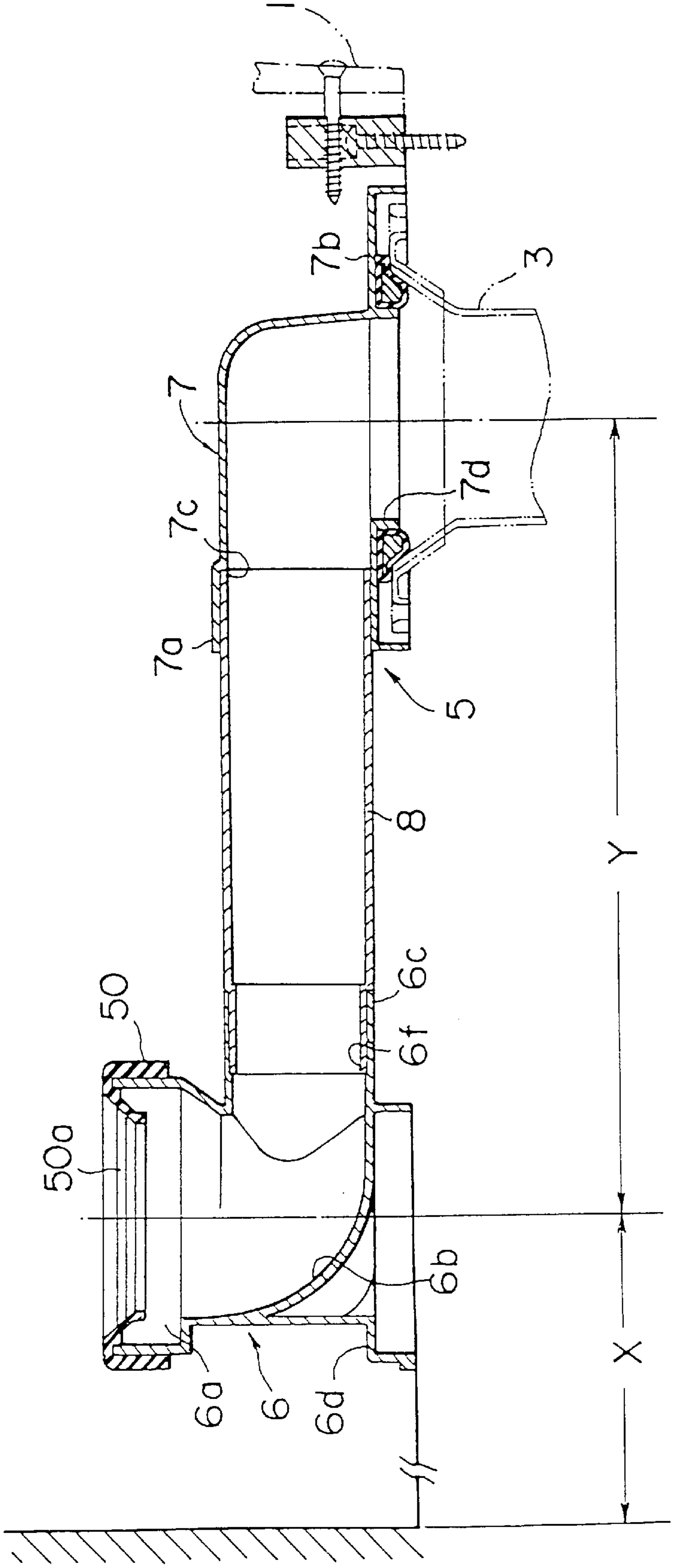
FIG. 5 is a vertical cross-sectional view which shows the main parts of another example of a connecting unit.

In this example as well, by using the scale M in the same manner as described for the above-noted embodiment, it is possible to achieve an installation with the linking pipe 8 cut to the prescribed length. That is, as shown in FIG. 5, when performing the installation so that the center of the flushing port 2 is positioned at a distance X from the wall, the flushing-side connecting pipe 6 is temporarily positioned so that its marker line 6*d*–1 is adjusted to the position of the distance X, and the distance from this marker 6*d*–1 to the center of the drainpipe 3 is then measured. Then if the scale M is used to cut the linking pipe 8 in accordance with the value of the distance Y, is it possible to make the connection between the distance from the flushing port 2 and the drainpipe 3.

If this kind of installation is performed, even in cases in which the distance X from the wall to the center of the flushing port 2 differs, it is possible to cut the linking pipe 8, enabling installation of the toilet stool 1 close to the wall, even in cases for example in which there is a pipe leading to a flushing water tank or a water-shutoff valve at the wall side, thereby enabling installation which is not influenced by limitations imposed by the rough-in dimension.

Additionally, by providing the marker lines 6*d*–1 and 7*a*–1, even if there is no scale M, it is possible to achieve an installation that fits the installation site, this being illustrated by FIGS. 8 through 11.

It is possible to identify the position of the center P1 of an existing drainpipe 3 at the installation site, and it is possible to install the toilet stool 1 so to achieve a proper distance between its rear edge (the left side as shown in FIG. 1) and the wall by establishing the center P2 of the flushing port 2. By temporarily fixing the drain-side connecting pipe 7 to the drainpipe 3, it is possible to align the drain-side connecting pipe 7 to coincide with the center P1, with the flushing-side connecting pipe 6, to which has be pre-attached the linking pipe 8, being temporarily placed so that its marker line 6*d*–1 is aligned with the center P2.

Figure 9:
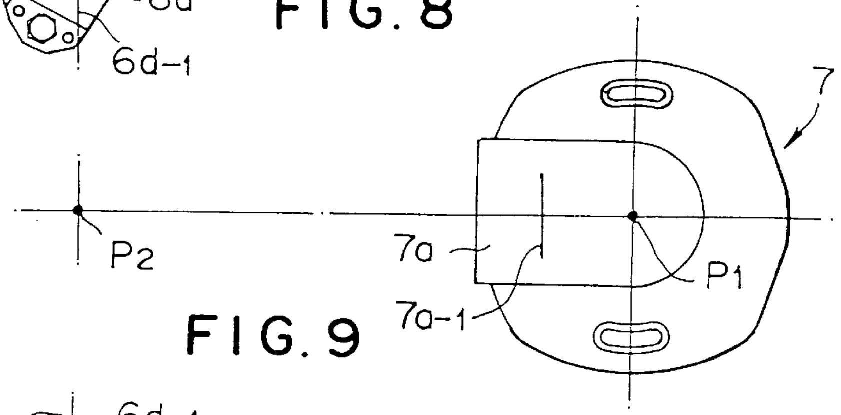

This temporary placement of the flushing-side connecting pipe 6 is done on the floor to the side of the drain-side connecting pipe 7. After making this temporary placement, as shown in FIG. 9, the marker line 7*a*–1, which indicates the limit of insertion of the linking pipe 8 corresponding to the step part 7*c*, is used to establish the cutting length of the linking pipe 8, the portion of the linking pipe 8 indicated with hatching being cut off accordingly.

Figure 6:
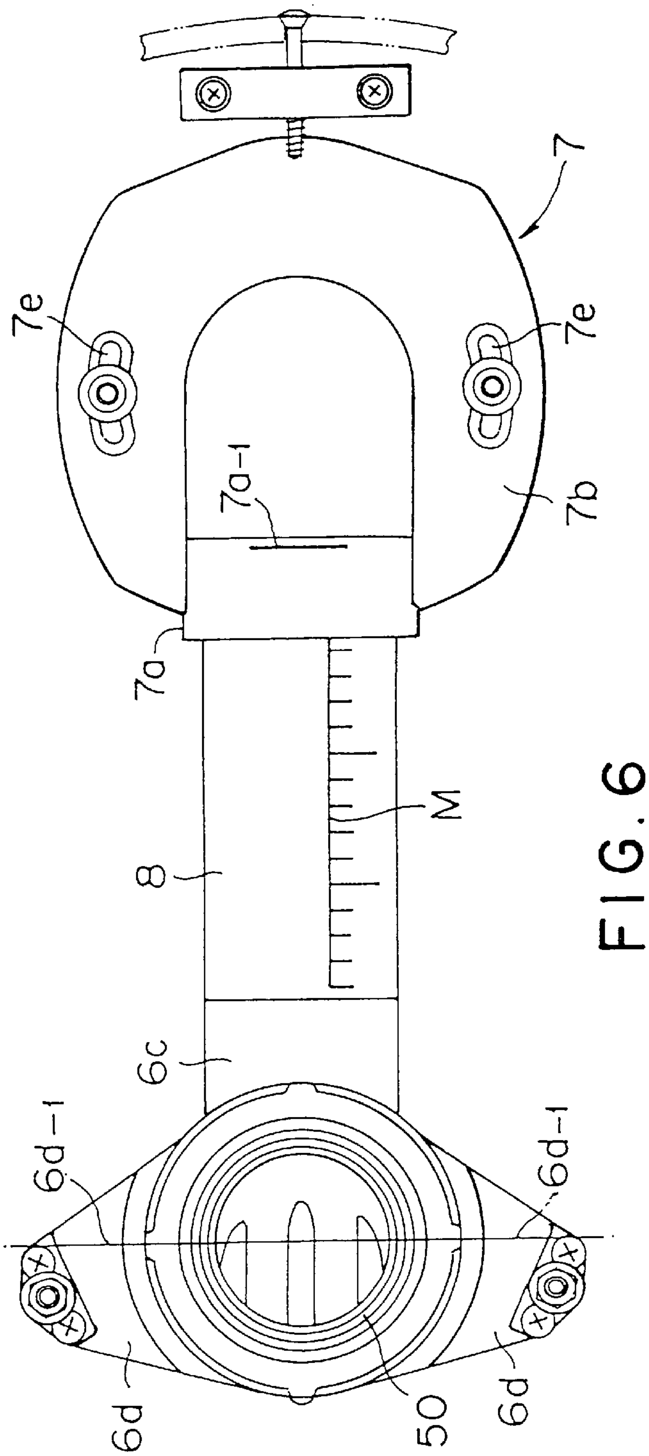
FIG. 6 is a top plan view of the connecting unit which is shown in FIG. 5.
Figure 8:
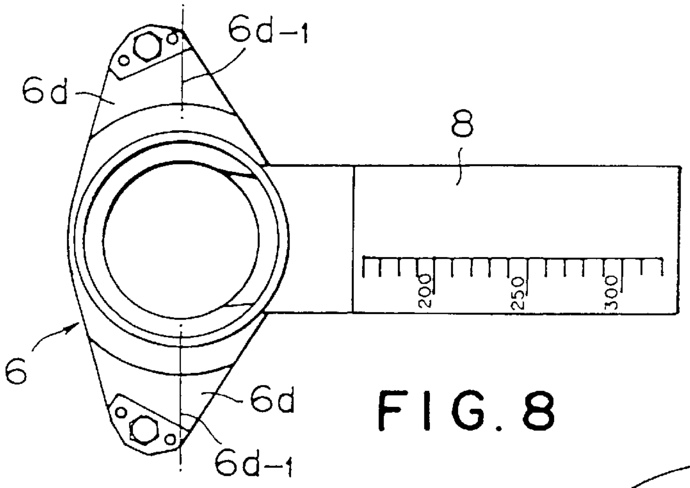
FIGS. 8 through 11 are drawings which show the method of cutting the linking pipe of the connecting units which are shown in FIG. 5 and FIG. 6.
Figure 10:
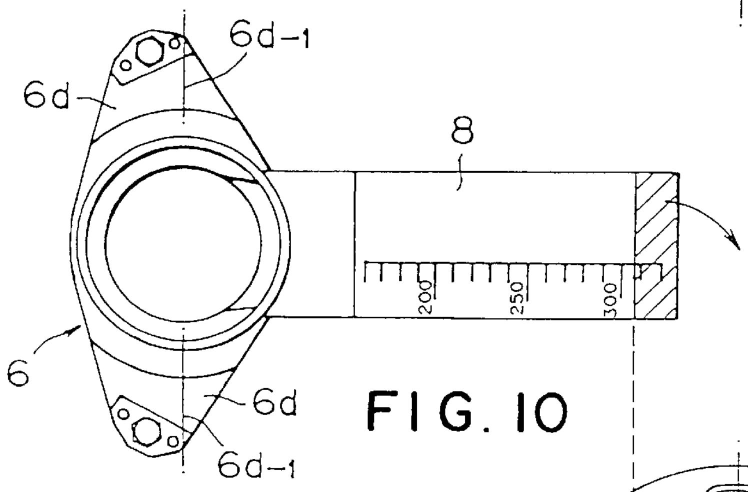

In this manner, even if the scale M on the surface of the linking pipe 8 is not used, or if the distance between the center of flushing port 2 of the toilet stool 1 and the center of the drainpipe 3 is not measured, by using the marker lines 6*d*–1 and 7*a*–1, it is possible to achieve an installation with the linking pipe 8 cut to the proper length. Therefore, while FIG. 6, FIG. 8, and FIG. 10 shows examples in which the scale M is provided, the present invention does not need to have this scale M.

Because the linking pipe 8 is cut so to adjust the distance to the drainpipe 3 using the position of the flushing port 2 of the toilet stool 1 as a reference, it is possible to perform the installation using the installation position of the toilet stool 1 as the reference. Therefore, in contrast to an installation in which the distance to the center of the drainpipe 3 is measured to determine the dimensions between the flushing port 2 and the drainpipe 3, it is possible to perform the installation using the installation position itself or the toilet stool as the reference. For that reason, in the case for example in which there is existing piping or a water-shutoff valve along the wall, in an installation which uses the wall as a reference, interference can easily occur between these parts and the rear part of the toilet stool 1, and the above-described installation eliminates these obstacles as well.

In the examples described with reference to FIGS. 1 through 3, in the case in which the linking pipe 8 is a round pipe, in making joints to the connecting pipes 6 and 7 at the flushing side and the drain side of the linking pipe 8, it is possible to apply to each of the joining surfaces an adhesive which serves also as a sealing material, thereby achieving a mutually bonded linkage. At a joint to which an adhesive is applied, two steps are necessary, one by which the adhesive is applied, and another by which the pieces are fitted together, and if the adhesive is a fast-drying type of adhesive, there is a possibility that the connecting pipes 6 and 7 on the flush and drain sides will be adhered in a twisted condition.

Figure 12:
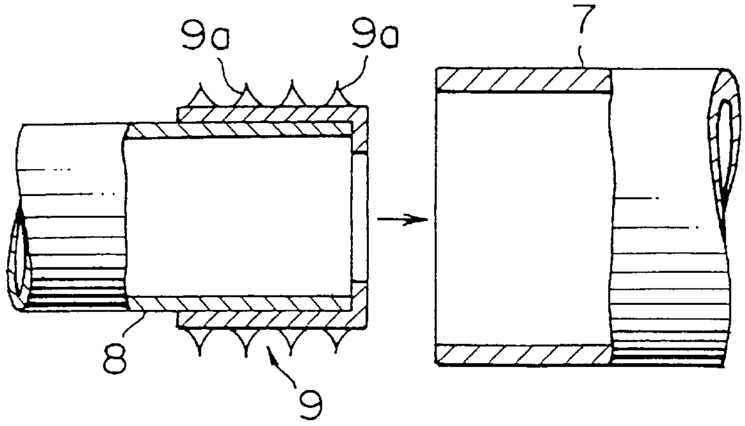
FIG. 12 is a cross-sectional view which shows the seal construction between a linking pipe and a flushing-side connecting pipe, this drawing showing an example in which a sealing material having fins is mounted to the outer surface of the linking pipe.
Figure 13:
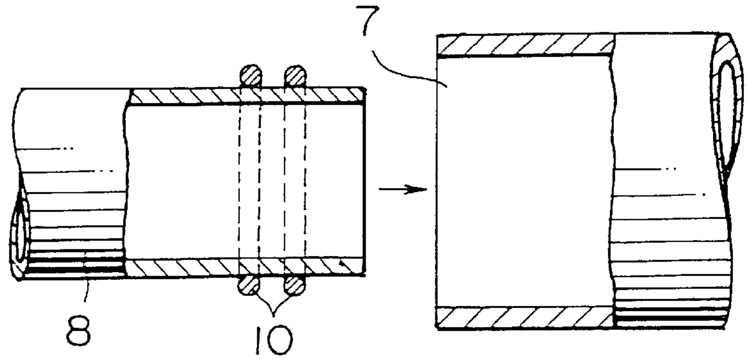
FIG. 13 is a cross-sectional view which shows an example in which an O-ring is provided around the outer periphery of the linking pipe.

With respect to the above-noted problem, it is possible to use a sealed joint which does not employ an adhesive, examples of this being shown in FIG. 12 and FIG. 13.

The drawings illustrate the construction of the seal between the linking pipe 8 and the drain-side connecting pipe 7, in which the outer diameter of the linking pipe 8 is made smaller than the inner diameter of the drain-side connecting pipe 7, and in the example shown in FIG. 12 a sealing material 9 is fitted over the end of the linking pipe 8 as a sealing piece. This sealing material 9 is a sealing material that is formed by a plurality of elastically deformable fins 9*a* which have an outer diameter which is larger than the inner diameter of the drain-side connecting pipe 7 and which are spaced from each other along the axial direction of the drain-side connecting pipe 7.

When the linking pipe 8 is inserted into the drain-side connecting pipe 7, the fins 9*a* are causes to lie down by elastic deformation in the direction opposite to the direction of insertion, the elastic reactive force of the fins 9*a* causes the two pipes to be joined tightly together.

In the example shown in FIG. 13, two O-rings are provided as sealing parts around the outer periphery of the linking pipe 8, and in this case as well, by inserting the linking pipe into the drain-side connecting pipe 7 these pipes are both held together and sealed.

The sealed connection made by means of the sealing material 9 and the O-rings 10 can also be applied in the same manner between the linking pipe 8 and the flushing-side connecting pipe 6.

In addition, when making a linkage between the linking pipe 8 and the two connecting pipes 6 and 7 on the flushing side and the drain side, it is necessary for the linking seat 6*a* of the flushing-side connecting pipe 6 and the annular seat 7*d* of the drain-side connecting pipe 7 to have opening axes which are mutually parallel. If these axes are mutually skewed from the parallel condition, a twisting between the flushing-side connecting pipe 6 and the drain-side connecting pipe 7 can occur, this presenting a problem in making the connection between the drainpipe and the flushing port 2.

To eliminate the above-noted problem, as already illustrated in FIG. 7, the cross-sectional shape at both ends of the linking pipe 8 is flattened, and the part of the flushing-side connecting pipe 6 and drain-side connecting pipe 7 that mate with the linking pipe 8 are flattened to the same shape, thereby preventing twisting.

Figure 14:
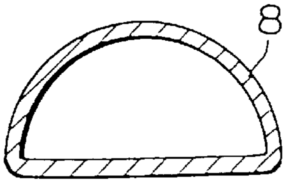
FIGS. 14 and FIG. 15 are vertical cross-sectional which show examples of the flat cross section of the opening at the end of the linking pipe.
Figure 15:
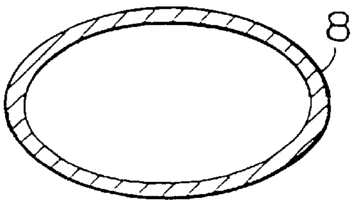

FIG. 14 and FIG. 15 show cross-sectional views of examples of the flattened shape of the ends of the linking pipe 8, which are provided for the purpose of preventing twisting or rotation.

FIG. 14 shows an example in which the bottom part of the cross section is linear and the top part is an arc, and FIG. 15 shows an example in which the cross section is approximately elliptical. As previously noted, by forming the mating ends of the flushing-side connecting pipe 6 and the drain-side connecting pipe 7 to be similar shapes, it is possible to uniquely establish the orientation of the flushing-side connecting pipe 6 and the drain-side connecting pipe 7 with respect to rotation about the axis of the linking pipe 8. Therefore, even if the flushing-side connecting pipe 6 and the drain-side connecting pipe 7 are connected with a linking pipe 8 between them, it is possible to reliably adjust the orientation of the flushing-side connecting pipe 6 and the drain-side connecting pipe 7 with respect to the flushing port 2 and the drainpipe 3.

In this manner, by flattening the opening at the connecting ends of the linking pipe 8, the flushing-side connecting pipe 6 and the drain-side connecting pipe 7, even in the case in which an adhesive is used in making the linkage, assembly is possible without the occurrence of twisting. Therefore, on-site installation is simplified and a high-quality installation is achieved.

Figure 16:
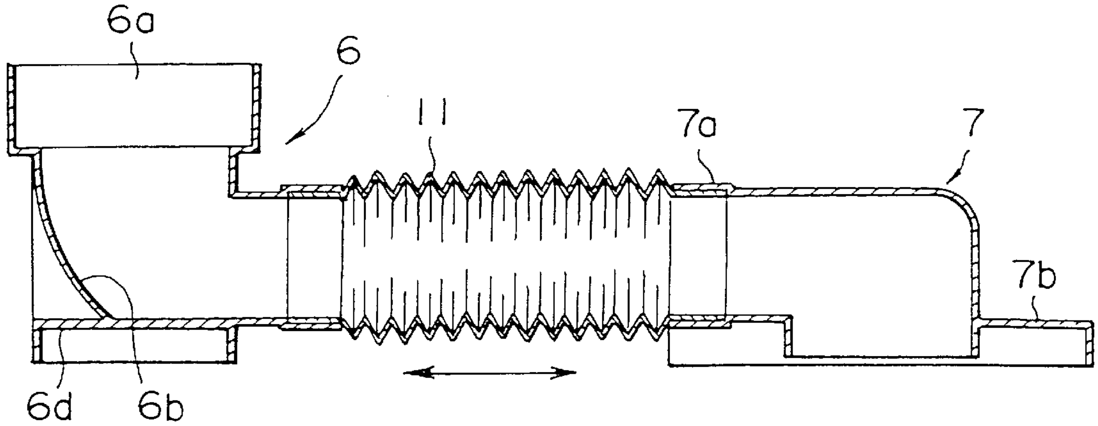
FIG. 16 is a vertical cross-sectional view which shows the connection construction between the flushing-side and drain-side connecting pipes, using a flexible linking pipe.

In each of the examples presented above, the linking pipe 8 is cut to adjust to the positions of the flushing port 2 and the drainpipe 3. In contrast to this, it is possible to employ the configuration which is shown in FIG. 16, which eliminates the burden involved with the cutting of the linking pipe 8 and improves the accuracy of the installation.

In this example, a flexible linking pipe 11 is connected between the flushing-side connecting pipe 6 and the drain-side connecting pipe 7, the length of the flexible linking pipe 11 being adjusted to absorb differences in the distance between the flushing port 2 and the drainpipe 3. The flexible linking pipe 11 can be fabricated from a bellows pipe having the required strength and made of a synthetic resin material, both ends of which are cylindrical in shape and which are inserted into the flushing-side connecting pipe 6 and the drain-side connecting pipe 7 to achieve a linkage.

By using the above-noted flexible linking pipe 11, the need to cut the linking pipe 11 at the installation site is completely eliminated, thereby lightening the work burden. In addition, the accidental cutting of the linking pipe 11 to a length too short with respect to the distance between the flushing port 2 and the drainpipe 3 is eliminated and, because it is possible to allow for an appropriate joining overlap at the ends of the of flexible linking pipe 11 with respect to the flushing-side connecting pipe 6 and the drain-side connecting pipe 7, it is possible to achieve a good installation without problems such as leakage.

In contrast to this, as is shown in FIG. 4, FIG. 8, and FIG. 10, in the case in which the length of linking pipe 8 is adjusted by cutting it, if the linking pipe 8 is accidentally cut off too short, the installation itself can be affected.

Figure 17:
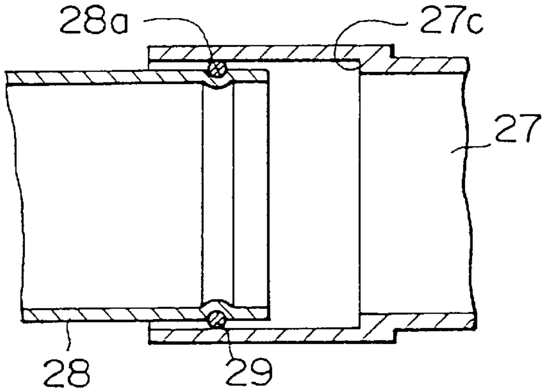
FIG. 17 is a cross-sectional view which shows the example of a linking pipe which is not cut and which has an adjustable length, this drawing showing the example of using a seal to enable sealing and joining.
Figure 18:
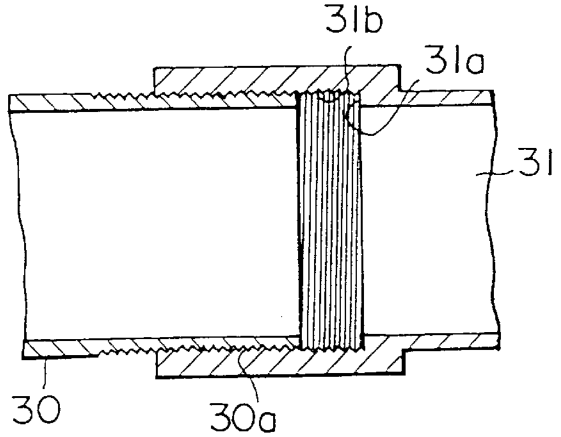
FIG. 18 is a cross-sectional view which shows the example of using a threaded joint to enable adjustment of the length of the linking pipe.

If, however, it is possible to adjust the length without cutting the pipe, even in the case in which, rather than a flexible linking pipe, a conventional pipe is used, it is possible to solve the above-noted installation problem, and this is illustrated by example in FIG. 17 and FIG. 18.

Figure 2:
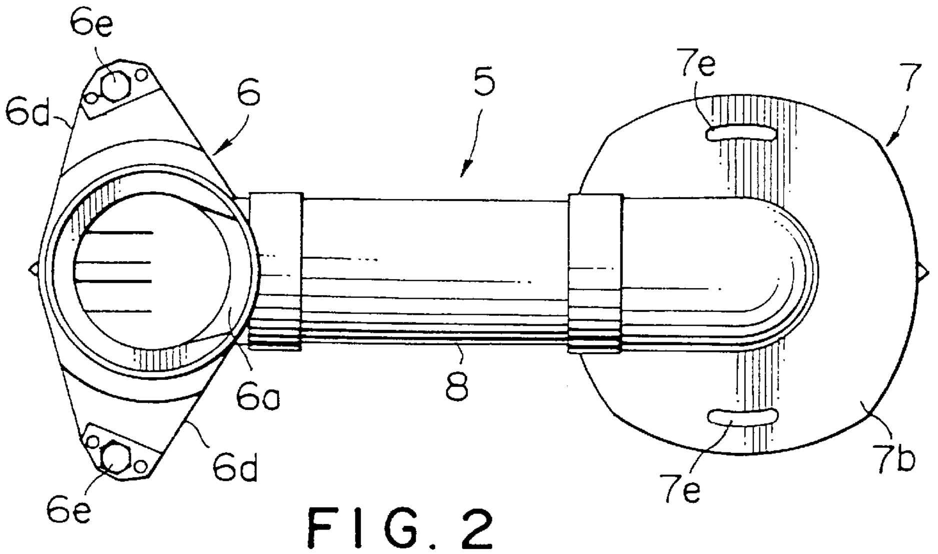
FIG. 2 is a top plan view of a connecting unit.

In the example shown in FIG. 17, in the same manner as is shown in the example shown in FIGS. 1 through 3, a step part 27*c* is provided in a drain-side connecting pipe 27 at a part that is a distance from the end this pipe, a linking pipe 28 being inserted into the drain-side connecting pipe 27 up to the step 27*c*. A groove 28*a* is formed around the outer surface of the linking pipe 28 in the region of the end of the linking pipe 28, a sealing O-ring 29 being mounted into this groove 28*a* as an elastic sealing material.

Using the arrangement having such an O-ring 29, when the linking pipe 28 is inserted into the drain-side connecting pipe 27, the linking pipe 28 and the drain-side connecting pipe 27 connection is held by means of the elastic mating action of the O-ring 29. Because the linking pipe 28 can be inserted into the drain-side connecting pipe 27 at any arbitrary position up to the step part 27*c*, it is possible to use this to adjust the length, thereby performing the installation without the need to perform a cutting operation.

In the example shown in FIG. 18, male threading 30*a* is cut in the end of a linking pipe 30 and female threading which mates with the linking pipe 30 is cut on the inside of the drain-side connecting pipe 31 up to a step part 31*a*. The step part 31*a* is not absolutely required, as it is also possible to use a pipe of uniform inner diameter as the drain-side connecting pipe 31.

Using the above-noted threading linking part, the axial direction length between the linking pipe 30 and the drain-side connecting pipe 31 can be adjusted in accordance with the amount of threading that is engaged by mutual rotation of the linking pipe 30 and the drain-side connecting pipe 31, this enabling length adjustment and further enabling installation in the same manner as presented above in the case of using an O-ring 29. Furthermore, in the actual installation, sealing tape is wrapped around the male threading 30*a* to achieve a seal when these threads are screwed into the female threading 31*b*.

In this manner, by using either an O-ring or a threaded connection, it is possible to adjust the length between the flushing port 2 and the drainpipe 3, and to reduce the work burden to the extent that cutting of the linking pipe is not necessary. It is also possible, of course, to apply the same type of sealed connection, either using an O-ring or threading, at the connection between the linking pipe and the flushing-side connecting pipe as well.

Figure 19:
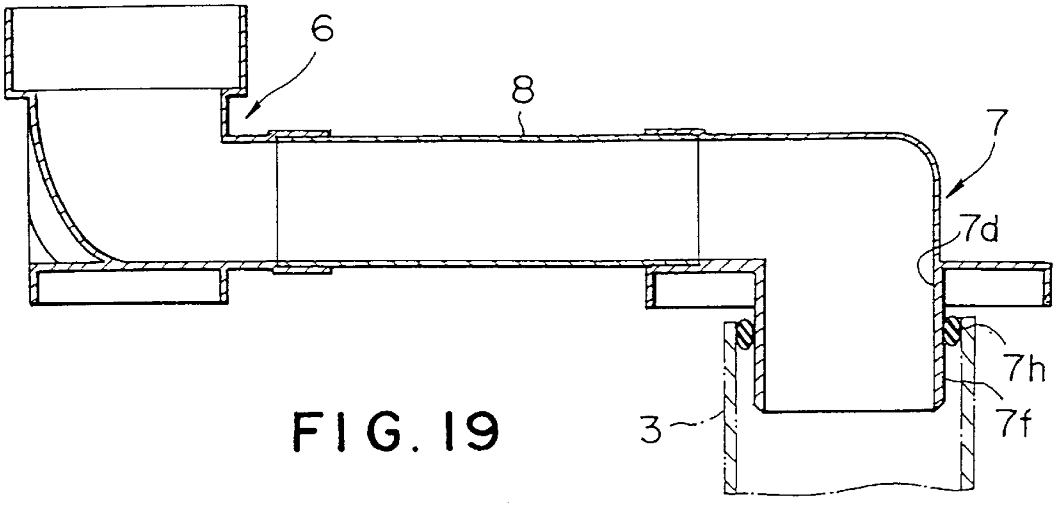
FIG. 19 is a vertical cross-sectional view which shows the main parts of an example in which a mating ring that is inserted up to the drainpipe is provided on the drain-side connecting pipe.
Figure 20:
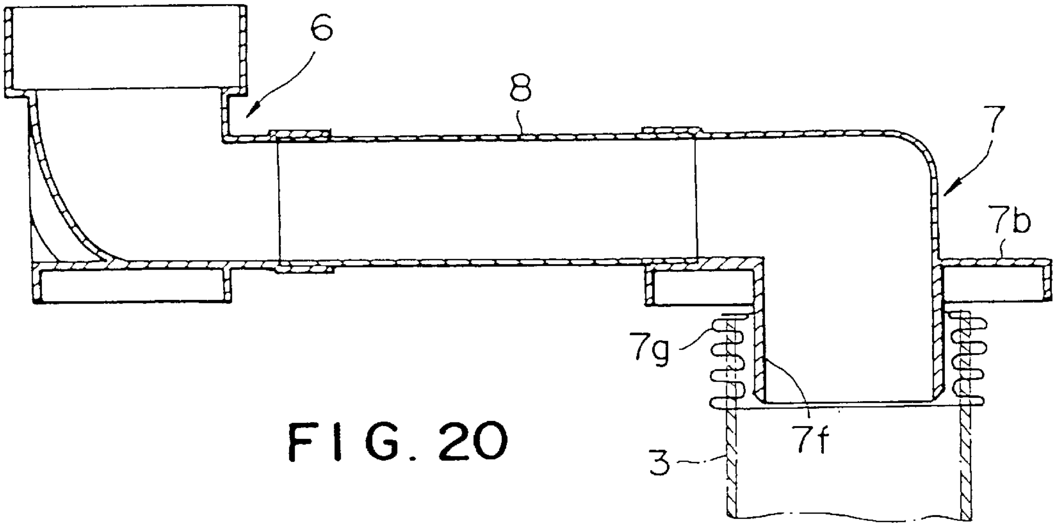
FIG. 20 is a vertical cross-sectional view which shows an example of providing fin-shaped packing on the outer periphery of the mating ring shown in FIG. 19.

In addition, to simplify the connection between the drain-side connecting pipe 7 and the drainpipe 3, it is possible to employ the configurations shown in FIG. 19 and FIG. 20. These examples illustrate the application of the connecting unit 5 which is shown in FIGS. 1 through 3.

In the example shown in FIG. 19, the annular seat 7*d* of the drain-side connecting pipe 7 of the above-noted embodiment is extended downward as a mating ring 7*f*, this mating ring 7*f* being inserted into an existing drainpipe 3, with packing 7*h* filled into the surrounding area as a sealing ring.

In the example shown in FIG. 20, a finned packing material 7*g* is mounted as a seal around the mating ring 7*f* shown in FIG. 19, which causes it to seat in the inside periphery of the drainpipe 3 to achieve a seal.

In this manner, by providing the mating ring 7*f*, it is possible to insert up to the floor flange 4 and the drainpipe 3 to achieve a direct linkage, and if the packing materials 7*g* and 7*h* are provided as part of the pipes, the sealing operating can be simultaneously performed. The flange 7*b* of the drain-side connecting pipe 7 can also be mounted into the floor by passing screws 7*e* through and screwing them into the floor, so that it is not absolutely necessary to have the floor flange.

Figure 21:
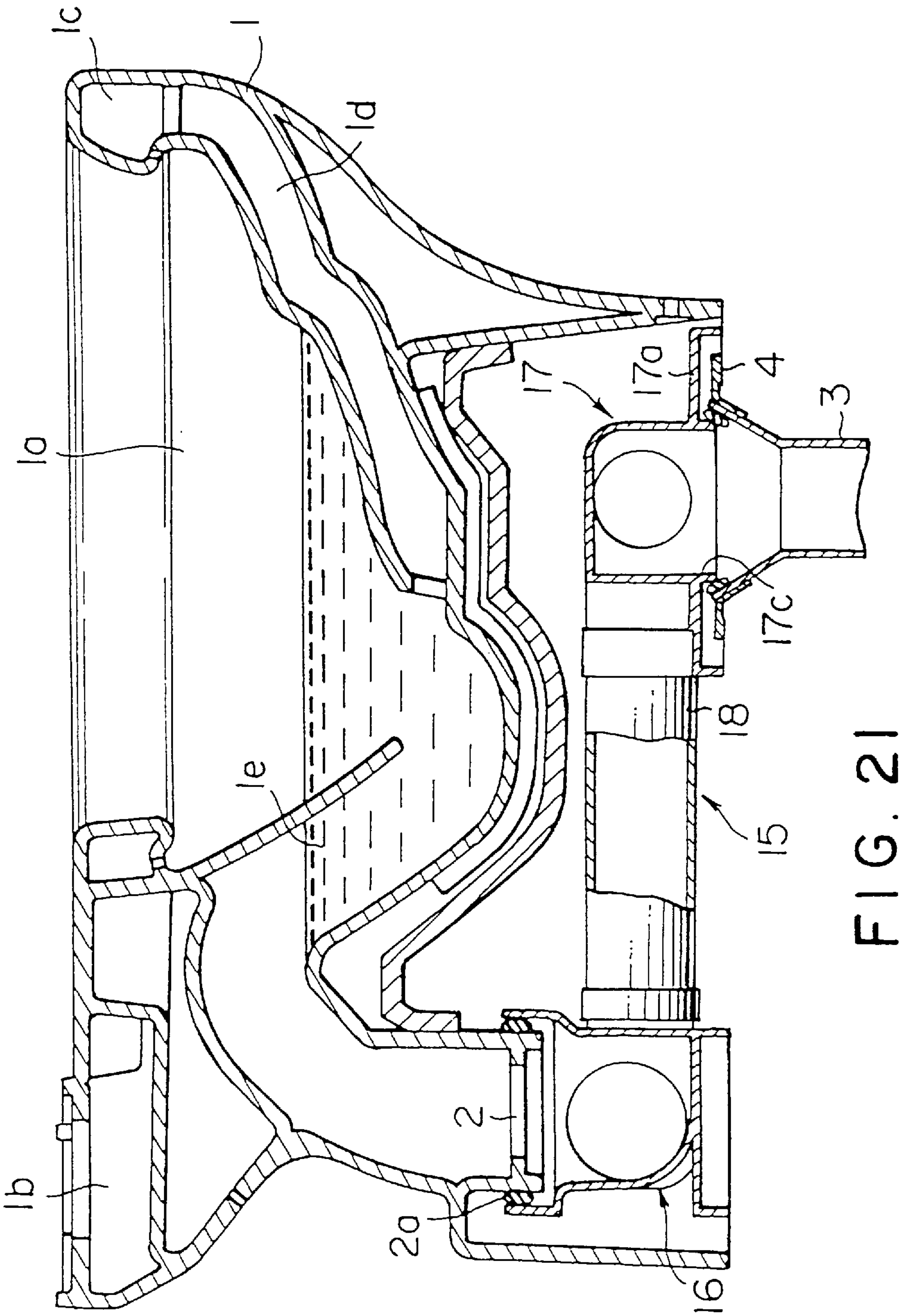
FIG. 21 is a vertical cross-sectional view which shows an example of a toilet stool in which the linking pipe of the connecting unit is shifted in lateral direction with respect to the toilet stool to form the flow path.
Figure 22:
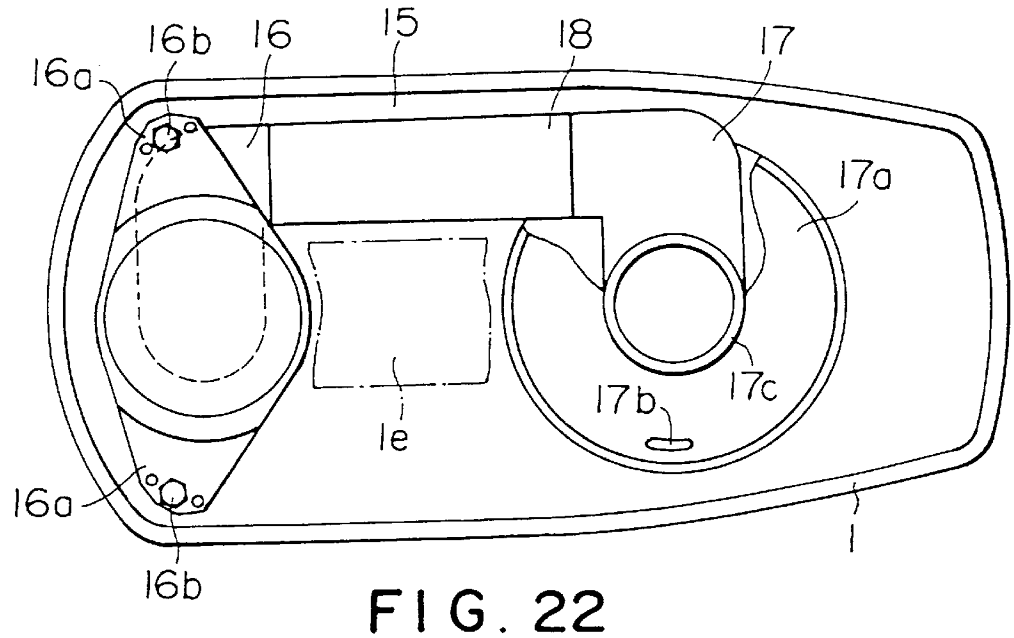
FIG. 22 is a bottom plan view of the piping of a connecting unit for the toilet stool of the example shown in FIG. 21.
Figure 23:
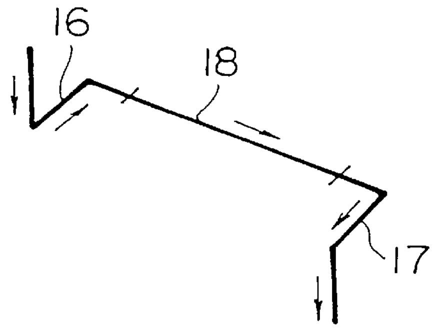
FIG. 23 is a skeleton drawing which shows the shape of the flow path from the flushing-side connecting pipe to the drain-side connecting pipe.

FIGS. 21 through 23 show another embodiment of the present invention.

In this embodiment, a connecting unit 15, the length of which can be changed to suit the distance between the center of the flushing port 2 of the toilet stool 1 and that of the drainpipe 3 is built in between the flushing port 2 of the toilet stool 1 and the drainpipe 3. This connecting unit 15, similar to the case of the previously described embodiment, has three parts: a flushing-side connecting pipe 16, a drain-side connecting pipe 17 which connects to the drainpipe 3 via the floor flange 4, and a linking pipe 18 which provides a link between these connecting pipes 16 and 17. As shown in FIG. 21, the linking pipe 18 is installed so as to detour around the center area of the toilet stool 1.

As shown in the skeleton drawing of FIG. 23, the bottom end of the flow passage formed by the flushing-side connecting pipe 16, which is coaxial with the flushing port 2, is veered to either the left or right with respect to the width direction of the toilet stool 1, after which it is shaped so as to extend to the front of the toilet stool 1 (the right side as shown in FIG. 21). The drain-side connecting pipe 18 is perpendicular to the part of the path at the rear of the toilet stool 1 and faces toward the center side of the toilet stool 1, a flow passage which extends downward from its end being formed. The linking pipe 18 is a straight pipe which positioned between the flushing-side connecting pipe 16 and the drain-side connecting pipe 17 and which is offset to one side in the width direction of the toilet stool 1.

Two mounting flanges 16*a* are provided on the bottom end of the flushing-side connecting pipe 16, making possible mounting to the floor by passing mounting screws through holes 16*b* provided in these flanges. A flange 17*a* having a mounting hole 17*b* is also provided on the drain-side connecting pipe 17, and on the bottom surface of this flange 17*a* is provided an annular seat 17*c*, which mates with the seal part of the floor flange 4.

In this example as well, the linking pipe 18 is a cuttable pipe material, which after being cut to the prescribed length is linked as one, using adhesive or the like, with the flushing-side connecting pipe 16 and the drain-side connecting pipe 17 to form the connecting unit 15.

The flow passageway between the flushing port 2 and the drainpipe 3, the centers of which are positioned at the center of the toilet stool in the width direction, is connected by the linking pipe 18 so as to be offset from the center of the toilet stool, in accordance with the shape of the flow passage formed by the flushing-side connecting pipe 16 and the drain-side connecting pipe 17. For this reason, even if the part leading from the bowl 1*a* to the trap passage 1*e*, which is the center part of the toilet stool 1, is deep, the linking pipe 18 is installed so as not to interfere with this deep part.

That is, in the toilet stool 1 shown in FIG. 21, even if the bottom end part is positioned lower than the upper end level of the linking pipe 18, since the linking pipe 18 detours to avoid the lowest part of the toilet stool 1, interference does not occur between the toilet stool 1 and the piping, in the same manner as described in a previous embodiment.

In this manner, by offsetting positioning of the linking pipe 18 in either direction to the left or to the right of the toilet stool 1, the need to establish a large clearance between the linking pipe 18 and the bottom surface part of the toilet stool 1 is eliminated, and there is no need to make the passage from the bowl 1*a* and the trap passage 1*e*. For this reason, the level of the trapped standing water can be maintained the same as in a conventional toilet stool, so that there is no elevating of the toilet stool 1.

Figure 24:
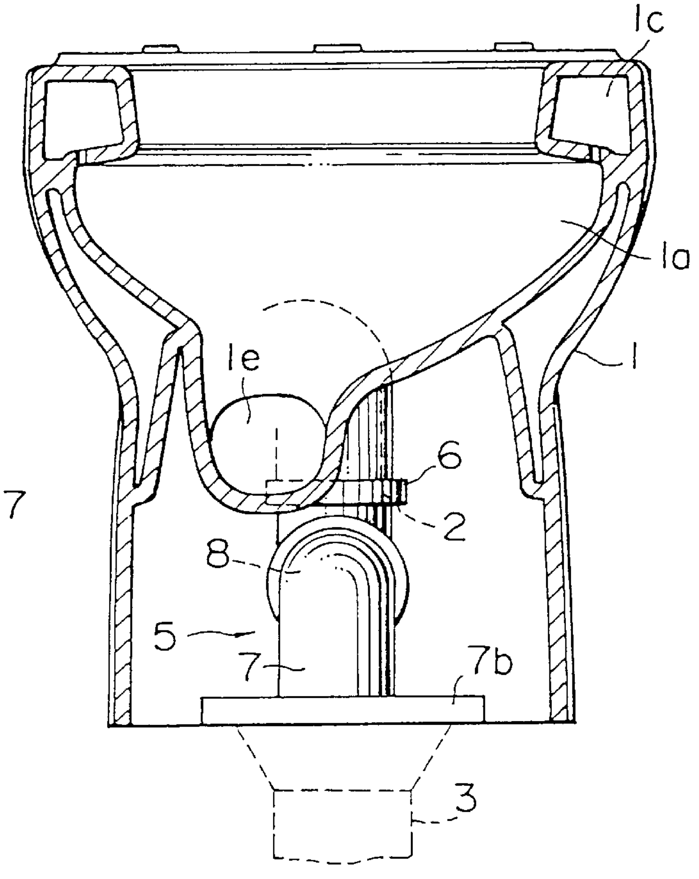
FIG. 24 is a vertical cross-sectional view which shows an example in which the trap of the toilet stool is shifted to the left side as viewed from the front, thereby eliminating interference with the connecting unit.

FIG. 24 is a drawing which shows yet another embodiment of the present invention, this drawing showing a cross-sectional view of the main part of the toilet stool 1 as viewed from the front (from the right side as shown in FIG. 1).

In the toilet stool 1 shown in FIG. 1 and in a conventional toilet stool of the past, an intake to the trap passage 1*e* is formed at the left-to-right center of the bowl 1*a*, the path that the center of the trap passage 1*a* describes lying in a single vertical plane.

In contrast to the this, in this embodiment the path from the bowl 1*a* to the trap passage 1*e* is shifted to the left, with the flushing port 2 positioned at the approximate left-to-right center. That is, the intake to the trap passage 1*e* from the bowl 1*a* is offset to the left from the center of the toilet stool in the lateral direction, so that the trap passage 1*e* from this intake into the deepest part is positioned on the left side, the downstream flow passage being twisted to the right side of the deepest part to form the flow passage leading to the flushing port 2.

Furthermore, in addition to positioning the flushing port 2 in the lateral center of the toilet stool 1, as shown in FIG. 24, it is possible to position the opening slightly offset to the right. Even if such a flushing port 2 is skewed from the center of the toilet stool 1, using a connecting unit 5 with a length that is the distance between the flushing port 2 and the drainpipe 3, it is possible to arrange the piping at an inclination with respect to the centerline.

Using such a flow passage from the bowl 1*a* to the flushing port 2 having the above-noted construction, the deep part at the lateral center part of the toilet stool 1 is eliminated, enabling the establishment of a space into which to house the connecting unit 5. Therefore, it is not necessary to use a detoured connecting unit 15 such as shown in FIG. 21 and FIG. 22, it being possible, for example, to use a connecting unit 5 such as shown in FIG. 2 and FIG. 3 which is suitable for use in the example shown in FIG. 1. In addition, in even the example, as shown in FIG. 24, in which the flushing port 2 is provided in a position offset to the right, there is no interference between the linking pipe 8 and the toilet stool 1.

In this example, because the size of the central part of the toilet stool protruding downward is made small, there is no need to twist the pipe of the connecting unit 15 to eliminate the interference. For this reason, because there is also no interference between the bottom surface part of the toilet stool 1 and the connecting unit 5, it is not necessary to elevate the toilet stool 1, thereby also eliminating the problem associated with the standing water level and sitting on the toilet stool.

Figure 25:
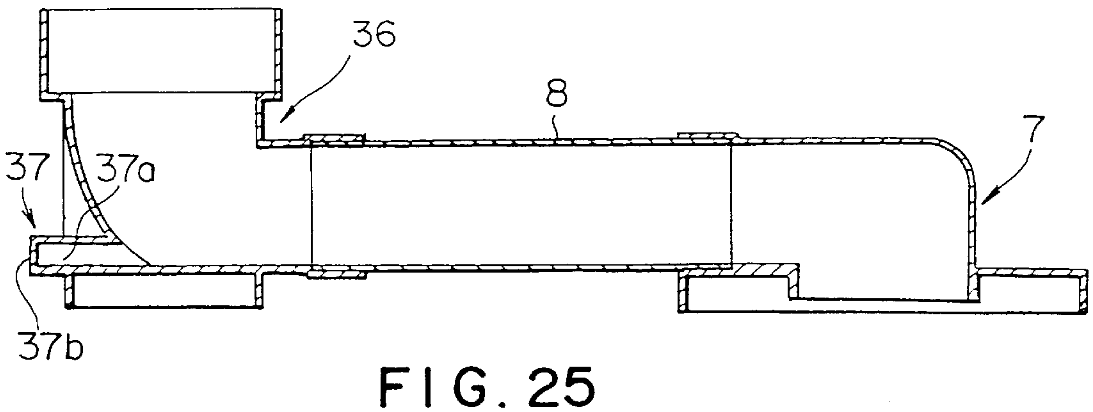
FIG. 25 is a cross-sectional view which shows an example in which a branched drain connecting part is connected to the flushing-side connecting pipe.

FIG. 25 is a cross-sectional view which shows a variation of the connecting unit shown in FIG. 3. In this embodiment, a branched drain connecting part 37 is connected continuously with one of the components making up the connecting unit, for example the drain-side connecting pipe 36. This branched drain connecting part 37 has formed on it a pipe-shaped branched drain passage 37*a*, this branched drain passage 37*a* being formed as one with and connected to the drain-side connecting pipe 36 so that it is continuous with the drain-side connecting pipe 36. The other end of the branched drain passage 37*a* is sealed by a sealing bulkhead 37*b*, this sealing bulkhead 37*b* being cuttable away as necessary so that it can be continuously connected to the outside of the connecting unit. Instead of the sealing bulkhead 37*b*, it is possible to have a blocking cap or a blocking material which is removably mounted.

If the above-noted branched drain connecting part 37 is provided, in the case in which, for example, a wash basin is to be added to the room in which the toilet stool is installed, the drainpipe of this basin or the like can be simply connected to the branched drain connecting part 37 after cutting away the sealing bulkhead 37*b*, enabling a drain without the need for any special piping construction.

Figure 26:
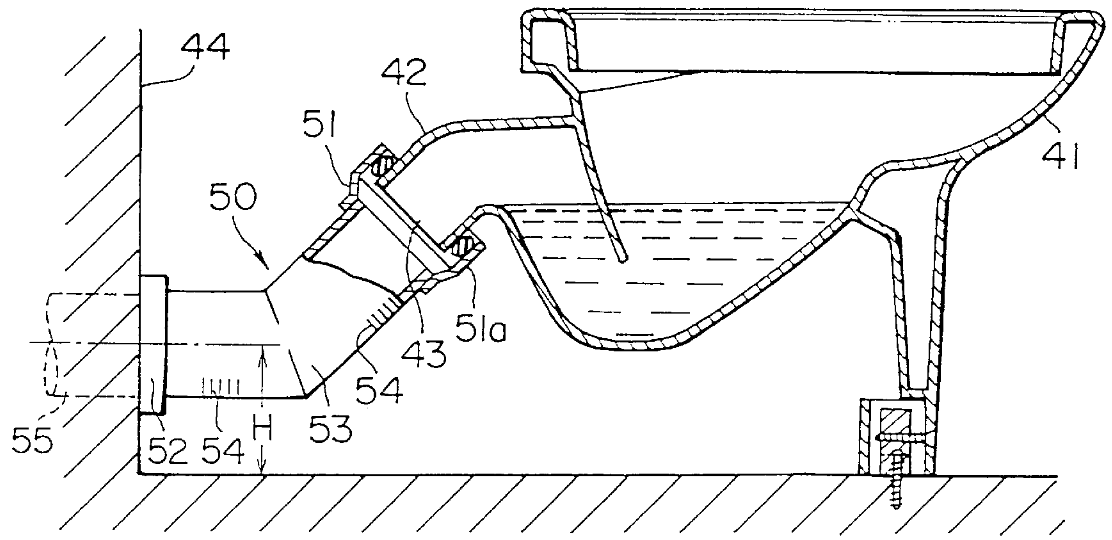
FIG. 26 is a cross-sectional view which shows an embodiment of a wall-draining type connecting apparatus.
Figure 27:
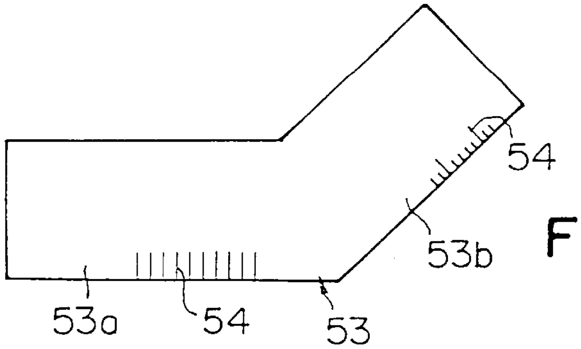
FIG. 27 side view of the linking pipe used in the embodiment which is shown in FIG. 26.

FIG. 26 and FIG. 27 are side cross-sectional views of a toilet stool for which a drainpipe is connected in the direction of a vertical wall surface 44, and an embodiment of a connecting apparatus for making connection to such a drainpipe.

In this embodiment, the trap drain passage 42 of the toilet stool 41 is cut off at an angle of 45° with respect to the drain passage, thereby providing a part of the trap drain passage 42 that is inclined at an angle of 45° with respect to the floor surface.

A flushing-side connecting pipe 51 is connected to this flushing port 43 which is formed on the end of this cutoff trap drain flow passage 42, this flushing-side connecting pipe 51 being further bent to make connection with a linking pipe 53.

Linking pipe 53, as shown in FIG. 27, is made up of a horizontal part 53*a* and a bent part 53*b*, which makes an angle of 135° with respect to the horizontal part 53*a*. On the outer surfaces of the horizontal part 53*a* and bent part 53*b* are provided scales which indicate the cutoff length for the purpose of adjusting the height in accordance with the installation position of the toilet stool. The horizontal part 53*a* of the linking pipe 53 is connected to a drain-side connecting pipe 52, which is perpendicularly mounted to the vertical wall surface 44.

In connecting the toilet stool 41 and the drainpipe 55 using a connecting unit 50 constructed as described above, part of the horizontal part 53*a* or inclined part 53*b* of the linking pipe 53 is cut off, in accordance with difference in height position between the trap drain passage 42 and the drainpipe 43. If the height of the drainpipe 55 from the floor level is H, as shown in FIG. 26 the cutting of the inclined part 53*b*, is done by cutting the horizontal part 53*a* or the inclined part 53*b* of the linking pipe 53, or both parts, at a marking on the scale corresponding to this height.

By doing this, it is simple and easy to connect the flushing port 43 to the drainpipe 55, in accordance with their height positions.

Figure 28:
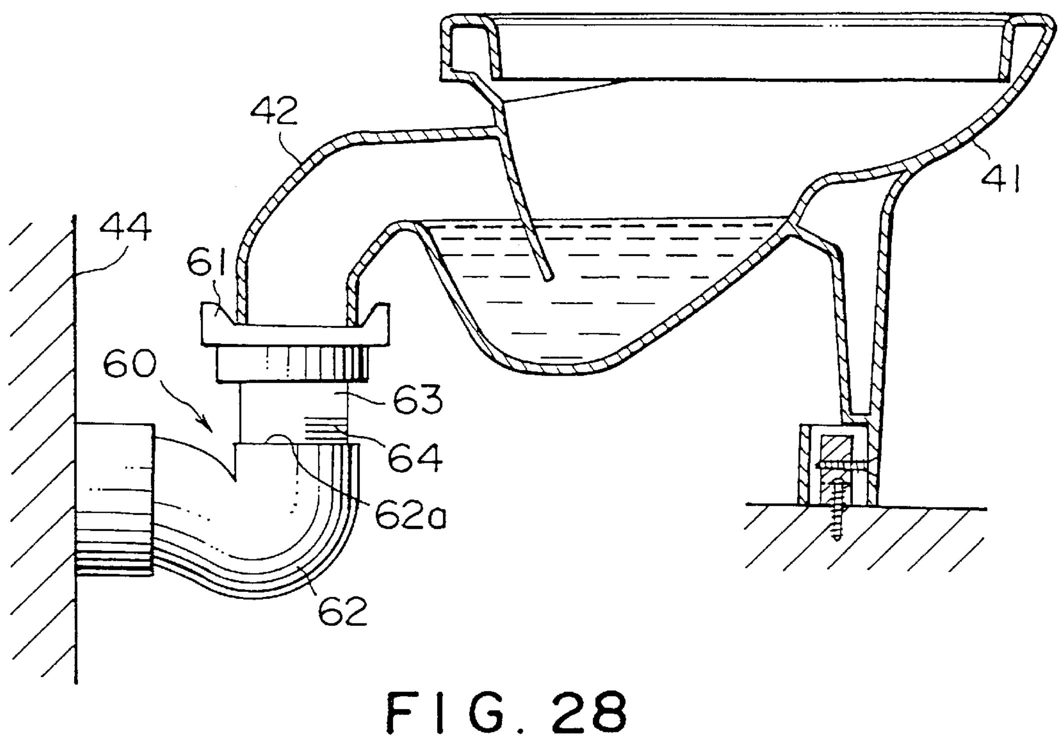
FIG. 28 is a cross-sectional view which shows another embodiment of a wall-draining type connecting apparatus.

FIG. 28 is a side cross-sectional view which shows yet another embodiment of a connecting apparatus for connecting a drainpipe in the direction of a vertical wall surface.

In this embodiment, the trap drain path 42 of the toilet stool 41 is cut off at a point at which its axis line is vertical. An L-shaped drain-side connecting pipe 62, one end of which is perpendicular to and inserted into the vertical wall surface 44, and the other end of which has an opening which faces vertically upward, is connected to the vertical wall surface 44.

On the bottom end drainpipe of the trap drain passage 42 is mounted a flushing-side connecting pipe 61, and also a linking pipe 63, which is formed from a vertical pipe and which has a scale marked on its outer surface, so that it is positioned between the flushing-side connecting pipe 61 and the drain-side connecting pipe 62.

When a connection between the toilet stool 41 and the drainpipe (not shown in the drawing) is made using a connecting unit 60 having a construction such as described above, the length of the linking pipe 63 is adjusted in accordance with the distance between the flushing port at the bottom end of the trap drain passage 42 and the upper end opening 62*a* of the drain-side connecting pipe 62. The adjustment of the length dimension of the linking pipe 63 is easily made by cutting the linking pipe 63 a point on the scale 64 of the linking pipe 63 which corresponds to the height position of the drainpipe from the floor.

Figure 29:
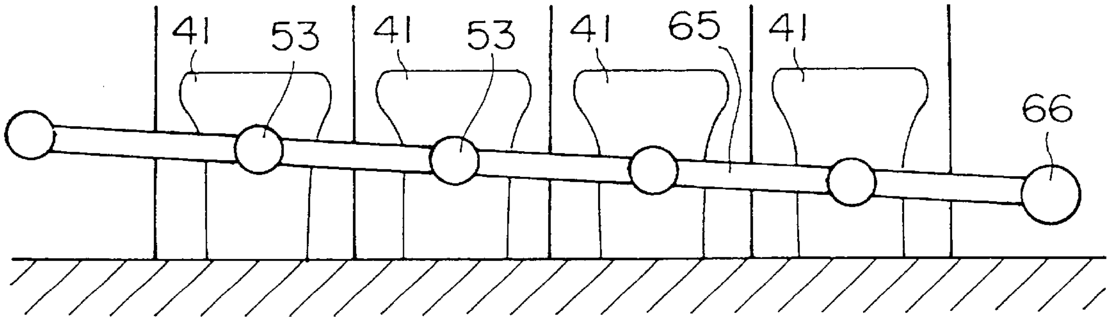
FIG. 29 is a drawing which illustrates an example in which a plurality of toilet stools are arranged sideways in a row.

FIG. 29 is a drawing which illustrates an example of a drain system which uses the above-described wall drain connecting apparatus. In the case in which a large number of toilet stools are lined up in a row, the piping construction can be facilitated by using the connecting apparatus according to the present invention.

Specifically, with a plurality of toilet stools 41 arranged in a row, a drain passage 65 is installed so as to pass across the trap drain path sides of the toilet stools 41. This drain passage 65 has an inclination imparted to it so that it becomes lower as it proceeds in the direction of a drainpipe 66.

The flushing ports of each of the plurality of toilet stools 41 are connected to this drain passage 65, the connection position to the drain passage 65 differing between each toilet stool 41 because of the inclination of the drain passage 65. Because of this arrangement, the height position adjustment can be easily made, as described above, by making cuts, in accordance with the scales on the horizontal part 53*a* and the inclined part 53*b* of the linking pipe 53.

According to the present invention as described above, it is easy to make connection to a variety of drainpipe heights from one and the same type of toilet stool. The connection as shown in FIG. 29 can also be made using the embodiment illustrated in FIG. 28.

Exploitation in Industry

As described in detail above, because the flow passage connection is made by means of two connecting pipes, a flushing-side connecting pipe and a drain-side connecting pipe, and a linking pipe, when compared to a configuration having two components, it is not only possible to make each of the components smaller, thereby simplifying the manufacture of each component, but also possible to improve the installation accuracy because high dimensional accuracy is maintained. In particular because three components are used, the cutting operation for the purpose of length adjustment is simplified.

It is also possible to make the flushing-side and drain-side connecting pipes small, thereby enabling a more compact installation than in the past.

In addition, the task of cutting the linking pipe at the installation site is further simplified, it being possible to cut the linking pipe to the proper length using the scale provided, by merely measuring either the distance between a wall and an existing drainpipe center or the distance between the flushing port of the toilet stool and the drainpipe, thereby achieving a distinctive improvement in ease of installation.

Because it is possible to place the flushing-side and the drain-side connecting pipes temporarily in the installation positions, instead of performing the installation using the wall as a reference, it is possible to use the installation position of the toilet stool itself as the reference, so that the installation can be performed without interference with, for example, existing piping. In addition, it is not necessary to measure the distance from the wall, thereby simplifying the installation work.

In addition, according to the present invention, because there is no interference of the length-adjustable pipe using to link the flushing-side and building-mounted drain-side pipes with the bottom part of the toilet stool, it is not necessary to elevate the toilet stool itself to provide clearance. For this reason, elevation of the level of standing water in the bowl and elevation of the toilet seat position are eliminated, thereby solving problems with water splashing and difficulty of sitting on the toilet stool seat.

In addition, according to the present invention, it is possible to perform installation in the case in which the drain pipe is built into a wall, enabling one and the same toilet stool type to be used in establishing a drain passage to accommodate a variety of drain height positions.

What is claimed is:

1. A connecting apparatus for making a connection between a flushing port which faces a floor surface onto which a toilet stool is to be installed and a drainpipe which faces toward a bottom surface of said toilet stool at a floor position which is skewed from the floor position of said flushing port, said connecting apparatus comprising a flushing-side connecting pipe for connecting to said flushing port, a drain-side connecting pipe for connecting to said drainpipe, and a linking pipe which makes a connection between said flushing-side connecting pipe and said drain-side connecting pipe, at least one of the linking pipe and the drain-side connecting pipe being mountable above the floor surface.

2. The connecting apparatus according to claim 1, wherein at least said flushing-side connecting pipe has an internal L-shaped flow passage, a corner part of said drain-side connecting pipe having a gradual bend.

3. The connecting apparatus according to claim 1, wherein a sealing material is mounted to the outer surfaces of both ends of said linking pipe, said sealing material making a sealed linkage to at least one of said flushing-side connecting pipe and said drain-side connecting pipe.

4. The connecting apparatus according to claim 1, wherein at least the cross-sectional outer contour of both ends of said linking pipe is flattened, said flushing-side connecting pipe and drain-side connecting pipe having an outer contour at their ends being matable with the linking pipe.

5. The connecting apparatus according to claim 1, wherein said linking pipe has a scale indicating a length to which it is to be cut.

6. The connecting apparatus according to claim 5, wherein said scale correlates to a distance from a wall which the rear side of the toilet stool faces to the center of said drainpipe.

7. The connecting apparatus according to claim 5, wherein said scale correlates to a distance from a wall which the rear side of the toilet stool faces to the center of said flushing port of the toilet stool and to the center of said drainpipe.

8. The connecting apparatus according to claim 1, wherein said flushing-side connecting pipe is provided with a marking for aligning the center of said flushing-side connecting pipe with said flushing port of said toilet stool, and wherein said drain-side connecting pipe has a marking which indicates a limit with respect to the insertion of said linking pipe.

9. The connecting apparatus according to claim 1, wherein said linking pipe is made of a flexible material which is stretchable and compressible.

10. The connecting apparatus according to claim 1, wherein at least one of said flushing-side connecting pipe and said drain-side connecting pipe fits together with said linking pipe with one of the two joined pipes fitting into the other, an elastic sealing material being fixed to the outside surface of the pipe which fits inside the other pipe or to the inside surface of the pipe which fits over the other pipe, said pipes being both joinable via said elastic sealing material and position adjustable in the axial direction.

11. The connecting apparatus according to claim 1, wherein a sealed joint is made between said linking pipe and at least one of said flushing-side connecting pipe and said drain-side connecting pipe by female threads and male threads formed on each, and further wherein this threaded joint enables position adjustment in the axial direction.

12. The connecting apparatus according to claim 1, wherein said drain-side connecting pipe is provided with a mating ring, said mating ring being formed as one with said drain-side connecting pipe and being insertable into said drainpipe.

13. The connecting apparatus according to claim 12, wherein said mating ring has a sealing ring on its outer surface which seals the inner surface of said drainpipe.

14. The connecting apparatus according to claim 1, wherein said flushing-side connecting pipe, said drain-side connecting pipe, and said linking pipe are configured as piping which makes a detour around a lateral direction center part of said toilet stool.

15. The connecting apparatus according to claim 1, wherein a flow passage from a bowl of said toilet stool to a trap flow passage of said toilet stool is offset in either left or right direction from the center of said toilet stool, so that said linking pipe is connectable so as to avoid an outer wall which forms the passage from said bowl to said trap flow passage.

16. The connecting apparatus according to claim 1, wherein a branched drain connection part is continuously connected to one of said flushing-side connecting pipe, said drain-side connecting pipe, and said linking pipe.

17. The connecting apparatus according to claim 16, wherein said branched drain connecting part is formed as one with and connected to one of said flushing-side connecting pipe, said drain-side connecting pipe, and said linking pipe.

18. A connecting apparatus according to claim 1, wherein the flushing-side connecting pipe has a first end connectable to the flushing part, the first end of the flushing-side connecting pipe being generally perpendicular to the floor surface.

19. A connecting apparatus for making a linkage between a flushing port which is formed on an end of a trap drain passage of a toilet stool and a drainpipe which is provided so as to be perpendicular to a vertical wall surface, said connecting apparatus comprising a flushing-side connecting pipe for connecting to said flushing port, a drain-side connecting pipe for connecting to said drainpipe, and a linking pipe which makes a connection between said flushing-side connecting pipe and said drain-side connecting pipe, at least one of the linking pipe and the drain-side connecting pipe being mountable above a floor surface on which the toilet stool is to be supported.

20. The connecting apparatus according to claim 19, wherein a sealing material is mounted to the outer surfaces of both ends of said linking pipe, said sealing material making a sealed linkage to at least one of said flushing-side connecting pipe and said drain-side connecting pipe.

21. The connecting apparatus according to claim 19, wherein at least the cross-sectional outer contour of both ends of said linking pipe is flattened, said flushing-side connecting pipe and drain-side connecting pipe having an outer contour at their ends being matable with the linking pipe.

22. The connecting apparatus according to claim 19, wherein said linking pipe has a scale which indicating a length to which it is to be cut.

23. The connecting apparatus according to claim 22, wherein said linking pipe comprises a horizontal part and an inclined part, and further wherein said scale is provided on said horizontal part and said inclined part.

24. The connecting apparatus according to claim 19 through 21, wherein said linking pipe is formed from a vertical pipe and wherein said drain-side connecting pipe is formed as an L-shaped pipe so that the drain passage is perpendicular.

25. The connecting apparatus according to claim 19, wherein said linking pipe is made of a flexible material which is stretchable and compressible.

26. The connecting apparatus according to claim 19, wherein at least one of said flushing-side connecting pipe and said drain-side connecting pipe is joinable together with said linking pipe with one of the two joined pipes fitting into the other, an elastic sealing material being fixed to the outside surface of the pipe which fits inside the other pipe or to the inside surface of the pipe which fits over the other pipe, said pipes being both joinable via said elastic sealing material and position adjustable in the axial direction.

27. The connecting apparatus according to claim 19, wherein a sealed joint is made between said linking pipe and at least one of said flushing-side connecting pipe and said drain-side connecting pipe by female threads and male threads formed on each, and further wherein this threaded joint enables position adjustment in the axial direction.

28. A connecting apparatus for making a connection between a flushing port of a toilet stool which is to be installed on a floor surface and a drainpipe, said connecting apparatus comprising a flushing-side connecting pipe for connecting to said flushing port, a drain-side connecting pipe for connecting to said drainpipe, and a linking pipe which makes a connection between said flushing-side connecting pipe and said drain-side connecting pipe, said linking pipe having a horizontal part and an inclined part, each part having a separate scale indicating a length to which the linking pipe is to be cut.

29. The connecting apparatus according to claim 28, wherein the drainpipe is provided generally perpendicular to a vertical wall surface and at least one of the scales correlates to a height of the drainpipe from the floor surface.

30. A method of installing a toilet stool comprising the steps of:

connecting a flushing-side connecting pipe to a flushing port of the toilet stool;

connecting a drain-side connecting pipe above a floor surface to a drainpipe;

connecting a linking pipe between the flushing-side connecting pipe and the drain-side connecting pipe;

providing a scale on the linking pipe indicating a length to which the linking pipe is to be cut; and cutting the linking pipe in order to position the flushing-side connecting pipe relative to the toilet stool.

31. The method of installing a toilet stool according to claim 30, wherein the step of providing a scale on the linking pipe indicating a length to which the linking pipe is to be cut correlates to a distance from a wall which a rear side of the toilet stool faces to the center of the drainpipe.

32. The method of installing a toilet stool according to claim 30, further including the step of providing said linking pipe having a horizontal part and an inclined part, each part having a separate scale indicating a length to which the linking pipe is to be cut.

* * * * *